US011308202B2

(12) United States Patent
Chevalier et al.

(10) Patent No.: US 11,308,202 B2
(45) Date of Patent: Apr. 19, 2022

(54) INTRUSION DETECTION SYSTEMS

(71) Applicant: Hewlett-Packard Development Company, L.P., Spring, TX (US)

(72) Inventors: Ronny Chevalier, Meudon (FR); David Plaquin, Bristol (GB); Maugan Villatel, Bristol (GB); Guillaume Hiet, Gif-sur-Yvette (FR)

(73) Assignee: Hewlett-Packard Development Company, L.P., Spring, TX (US)

( * ) Notice: Subject to any disclaimer, the term of this patent is extended or adjusted under 35 U.S.C. 154(b) by 78 days.

(21) Appl. No.: 16/486,331

(22) PCT Filed: Jun. 7, 2018

(86) PCT No.: PCT/US2018/036411
§ 371 (c)(1),
(2) Date: Aug. 15, 2019

(87) PCT Pub. No.: WO2018/226927
PCT Pub. Date: Dec. 13, 2018

(65) Prior Publication Data
US 2020/0089870 A1  Mar. 19, 2020

(30) Foreign Application Priority Data
Jun. 7, 2017 (EP) .................................... 17305673

(51) Int. Cl.
*G06F 9/54* (2006.01)
*G06F 21/52* (2013.01)
*G06F 9/455* (2018.01)

(52) U.S. Cl.
CPC .............. *G06F 21/52* (2013.01); *G06F 9/546* (2013.01); *G06F 9/45558* (2013.01); *G06F 2009/45591* (2013.01)

(58) Field of Classification Search
CPC ...... G06F 9/45533; G06F 9/5077; G06F 9/54; G06F 9/542; G06F 9/544; G06F 9/546
USPC .............................. 718/1; 719/312, 313, 314
See application file for complete search history.

(56) References Cited

U.S. PATENT DOCUMENTS

| 6,938,124 | B2 | 8/2005 | Rust |
| 8,155,134 | B2 | 4/2012 | Fairhurst |
| 8,479,276 | B1 | 7/2013 | Vaystikh |
| 9,037,854 | B2 * | 5/2015 | Roth ....................... G06F 21/53 713/164 |
| 9,223,983 | B2 | 12/2015 | Dong |

(Continued)

OTHER PUBLICATIONS

Patel, Krutartha et al., "Ensuring Secure Program Execution in Multiprocessor Embedded Systems: a Case Study", 2007, In Proceedings of the 5th IEEE/ACM Int'l Conference on HW/SW Codesign, pp. 57-62.

(Continued)

*Primary Examiner* — Andy Ho
(74) *Attorney, Agent, or Firm* — HP Inc. Patent Department

(57) ABSTRACT

An intrusion detection system, comprising a monitor to receive messages from a target over a low-latency communication link comprising a controlled access memory structure logically positioned between the target and the monitor using point-to-point interconnects, the controlled access memory structure to receive a message from the target indicating that the target has entered a controlled mode of operation.

17 Claims, 3 Drawing Sheets

(56) References Cited

U.S. PATENT DOCUMENTS

| | | | |
|---|---|---|---|
| 10,846,117 B1 * | 11/2020 | Steinberg | ............. G06F 9/5077 |
| 2002/0091826 A1 | 7/2002 | Comeau | |
| 2008/0294848 A1 | 11/2008 | Harris | |
| 2009/0119748 A1 | 5/2009 | Yao | |
| 2011/0197256 A1 | 8/2011 | Sharkey | |
| 2013/0160028 A1 | 6/2013 | Black | |
| 2014/0082327 A1 | 3/2014 | Ghose | |
| 2014/0325239 A1 | 10/2014 | Ghose | |
| 2016/0063255 A1 | 3/2016 | Jeansonne | |

OTHER PUBLICATIONS

Yee, Bennet "Using Secure Coprocessors", May 1994. Available at: < http://citeseerx.ist.psu.edu/viewdoc/download?doi=10.1.1.28.4872&rep=rep1&type=pdf >.

* cited by examiner

INTRUSION DETECTION SYSTEMS

BACKGROUND

Low-level execution environments such as the kernel of an Operating System (OS), a hypervisor in a virtualised system or firmware have direct access to system hardware and are highly privileged. Alteration to their expected behaviour, malicious or not, can have undesirable consequences for the confidentiality, integrity or availability of the system in the question.

BRIEF DESCRIPTION OF THE DRAWINGS

Various features of certain examples will be apparent from the detailed description which follows, taken in conjunction with the accompanying drawings, which together illustrate, by way of example only, a number of features, and wherein.

DETAILED DESCRIPTION

Figure 1:
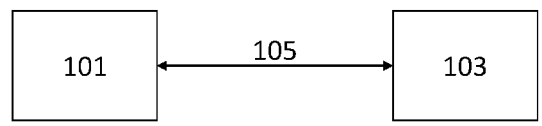
FIG. 1 is a schematic representation of an intrusion detection system according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

In an execution environment, such as a computing device or a virtual system, boot firmware, such as the Basic Input/Output System (BIOS) or Unified Extensible Firmware Interface (UEFI) compliant firmware, are used to test and initialise hardware components before transferring execution to an OS.

In a virtualised system, in which one or more virtual machines (VMs) may be instantiated over physical hardware, a hypervisor or virtual machine monitor (VMM) is used to apportion hardware access and present and manage the execution of an OS to VMs.

Arbitrary instructions executed in one of these low-level execution environments, which changes its original expected behaviour (such as skipping a verification step), can compromise subsequent parts of the system. Accordingly, tampering with these environments is appealing for attackers who may try to infect them with malware. Due to the nature of these environments and their early execution, such malware can become persistent, hard to detect and remove, and be independent of an OS.

On x86 instruction set systems (which are based on a family of backward-compatible instruction set architectures) for example, a highly privileged execution mode of the CPU, the System Management Mode (SMM), can modify the system flash which contains the boot firmware. Use of the SMM can prevent a compromised operating system infecting the system firmware.

More specifically, during an initial system boot process, and before executing the system OS, the boot firmware can load some instructions into so-called System Management RAM (SMRAM). These instructions correspond to privileged functions to be executed in SMM. The firmware can the lock the SMRAM and the flash (using hardware features) to prevent modification by the OS.

It is also possible to use cryptographic signatures during a boot process and an update process so that firmware signed by a vendor's key is executed. In addition, measurements (cryptographic hash) of components and configurations of the boot process can be computed and stored at boot time to attest to the integrity of the platform.

While cryptographic signatures and measurements provide instruction and data integrity at boot time, they may not preclude an attacker exploiting a vulnerability in the SMM, for example, at runtime of the system. Accordingly, if an attacker manages to execute malicious instructions in the SMM or another low-level execution environment, it can create malware that is undetectable to an OS.

According to an example, there is provided an intrusion detection system (IDS) to detect intrusions that modify the expected behaviour of a low-level execution environment at runtime. The IDS can be used to monitor the integrity of the SMM at runtime, and may be used to monitor a kernel or VMM or other low-level execution environment.

Part of the system uses a monitor to receive messages from a target forming a monitored component of a system. In an example, the monitor is isolated from the monitored component by using a co-processor, which is a structurally separate device. An IDS according to an example leverages a communication channel that enables the target to send information to bridge a semantic gap between the monitor and the target.

FIG. 1 is a schematic representation of an intrusion detection system according to an example. A monitor 101 can receive messages from a target 103 over a low-latency communication link 105. In an example, monitor 101 can be a co-processor, and is a trusted component that is used to detect intrusions in the system. Any alteration to the normal behaviour of the host system does not affect the integrity of the monitor.

The isolation offered by the monitor 101 implies a loss in knowledge of the context in which instructions executed on the target 103. Without the full context, there can be a semantic gap between what the target's actual behaviour is, and what the monitor 101 can infer. For example, there may be a shortfall of knowledge relating to a virtual to physical address mapping, or an execution path taken. According to an example, the communication channel 105 between the monitor 101 and the target 103 enables the target 103 to send information to the monitor 101 in order to narrow the semantic gap for the monitor 101.

According to an example, the following properties are presented:

Data integrity—If a message is sent to the monitor, it may not be removed or modified afterwards. Otherwise, if an attacker compromised the target it could modify or remove a message before being processed to hide its intrusion.

Chronological order—Messages are processed at the monitor in the order of their emission from the target otherwise an attacker could rearrange the order to evade the detection depending on the detection approach.

Access—When the target is executing, no other component has access to the communication channel. Otherwise, an attacker could send messages faking a legitimate behaviour.

Low latency—Sending a message should be fast (e.g., sub-microsecond) so that low-level components can minimize the time spent performing their task to avoid impacting the user space applications.

According to an example, communication from the target 103 to the monitor 101 can be enabled using an instrumentation step during compilation of the instructions to be executed on the low-level execution environment under consideration (i.e. the target). Such instrumentation can, for example, operate at the compiler level or by rewriting binary if it does not have access to a set of source instructions.

According to an example, instrumentation can fetch information at runtime from the target at a location known at compile time. Control flow integrity (CFI) is an example of such instrumentation where the compiler can instrument binary instructions without recourse to a developer. A further instrumentation according to an example can be an ad hoc approach that uses manual modification of source instructions of the target or that can provide other information such as annotations. For example, x86 control registers, like CR3, can change the behaviour of a system if an attacker can modify their value. The expected value of the registers is known, as is the case when a modification is legitimate. Thus, an instrumented portion of instructions can be used to send the value of these registers to the monitor.

Figure 2:
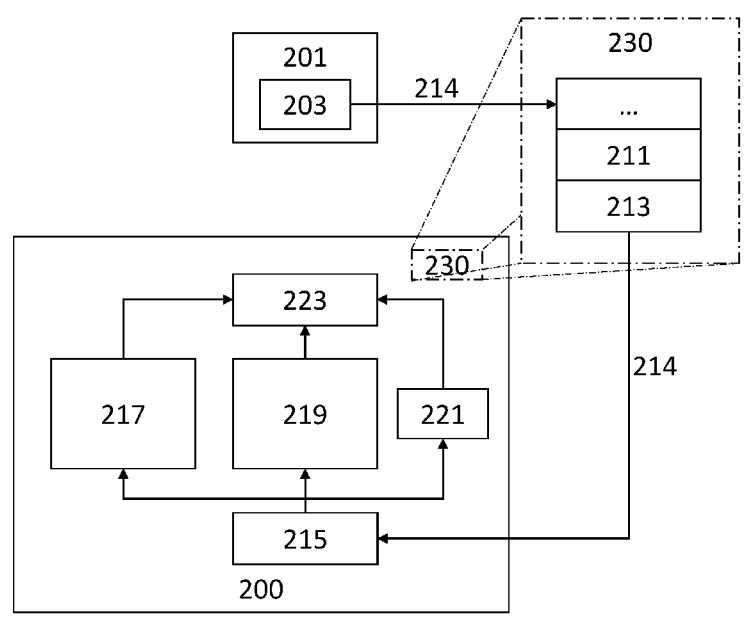
FIG. 2 is a schematic representation of an intrusion detection system according to an example.

FIG. 2 is a schematic representation of an intrusion detection system according to an example. Monitor 200 can receive messages 211, 213, ... and so on from a target 201 over a low-latency communication link 214.

According to an example, monitor 200 can be a co-processor that can be used as security processor to perform sensitive tasks and handle sensitive data (e.g., cryptographic keys). The main processor of a system does not directly access the security processor memory. Thus, it cannot access sensitive data, but can query the co-processor to perform tasks via a communication channel.

The latency of a communication channel, link or pathway can impact the latency of System Management Interrupt (SMI) handlers for each message sent from a target to the monitor. An acceptable latency can be of the order of 150 µs. Fast and frequent SMIs cause a degradation of performance (I/O throughput or CPU time). On the other hand, long and infrequent SMIs cause a user experience degradation, where audio playback using a USB device is considered unresponsive by the driver, and a severe drop in frame rates in game engines can occur for example.

Therefore, according to an example, a controlled access memory structure 230 can be logically positioned between the target and the monitor using point-to-point interconnects in order to enable a low-latency communication path between a target and monitor. In an example, the memory structure may form part of the target, part of the monitor or be a separate component so that a co-processor can be used as monitor without modification. In this connection therefore, logical positioning refers to the memory structure being configured to receive data from a target and send data to (or have the data pulled from) a monitor and does not preclude the structure from being formed within or as part of a target or monitor or being a separate component in a system. Other components may physically lie in between a target and monitor.

In an example, the memory structure can use a restricted access First In First Out (FIFO) queue that allows the target to push and the monitor to pop messages. In an example, the FIFO can receive messages fragmented in packets. The FIFO can store messages sent by the target that are awaiting processing by the monitor.

In an example, the memory structure 230 can handle a write pointer. Thus, an attacker does not control it and does not have access to its memory and cannot therefore violate the integrity of the messages. The monitored component (target) 201 has a mapping between a physical address and the memory structure 230. At the beginning of each SMI, the target 201 or the monitor 230 can ensure that the target has a mapping to communicate with the monitor in order to avoid other devices communicating with it while in SMM and to avoid remapping attacks. A system as depicted in FIG. 2 fulfils the data integrity property mentioned above since the target does not have direct access to the monitor memory, it can push messages and if the queue is full it does not wrap over. It fulfils the chronological order property because there is no concurrent access to it while in SMM. Moreover, it fulfils the exclusive access property since one core is active while in SMM and no other device can communicate with the monitor. Finally, for the last property regarding the low latency, a fast interconnect, such as a point-to-point interconnect, between the main processor executing the monitored component and the monitor can be used. The interconnect used depends on the CPU manufacturer. In x86 architectures, for example, a QuickPath (QPI) or Hyper-Transport interconnect can be used. These interconnects are used for inter-core or inter-processor communication and are specifically designed for low latency.

Referring to FIG. 2, instructions executing in the firmware 203 of a target 201 are pushed as packets 211, 213 to the memory structure 230 of the monitor 200. Monitor 200 can fetch messages from the structure 230 at block 215. Initially, the memory structure 230 can receive a message from the target 201 indicating that the target 201 has entered or is in a controlled mode of operation, such as SMM for example. That is, in order for the monitor 200 to ensure that when the target 201 is executing, it has exclusive access to the communication link 214, the target 201 can use an extra signal to notify the monitor 200 that it has entered the execution mode for the low-level instructions. For example, with ARM TrustZone the Non-Secure bit (NS-bit) can be used to differentiate whether the processor is currently executing low-level instructions in a secure space or not. On an x86 architecture, the monitor 200 can also determine when the processor is executing in SMM by using a signal available at the chipset level. Additionally, any logical signalling that can be trusted by the monitor (such as by using virtual wires, cryptographically authenticated signals, etc.) can be used to notify the monitor of the execution of the low-level instructions.

Thus, a data integrity property is respected since the target 201 does not have direct access to the monitor memory structure 230. It can push messages and if the queue is full it does not wrap over. In an example, structure 230 can fulfil the chronological order property because it is in the form of a FIFO queue and there is no concurrent access to it while the target is executing. The queue can be in the form of a linear or circular array in which messages are processed in the order in which they are received.

Messages fetched from memory structure 230 are processed by the monitor to determine if there is any deviation from an expected behaviour at the target 201. For example, the messages can be compared with a list, map or graph of expected behaviour to determine the presence of deviations (223) in indirect calls handling (217), shadow stack calls (219) and other suitable behaviours (221).

According to an example, target 201 can be a hypervisor of a virtualised system or a kernel of an OS. Monitor 200 can be virtual machine. For example, a virtual machine can be instantiated over physical hardware allocated in a virtualised system using a hypervisor forming the monitored component. The virtual machine can comprise a secure execution environment inaccessible to other components of the virtualised system.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above may show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, modules of apparatus (for example, monitor 200) may be implemented by a processor executing machine readable instructions stored in a memory, or a processor operating in accordance with instructions embedded in logic circuitry. The term 'processor' is to be interpreted broadly to include a CPU. processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode.

For example, the instructions may be provided on a non-transitory computer readable storage medium encoded with instructions, executable by a processor.

Figure 3:
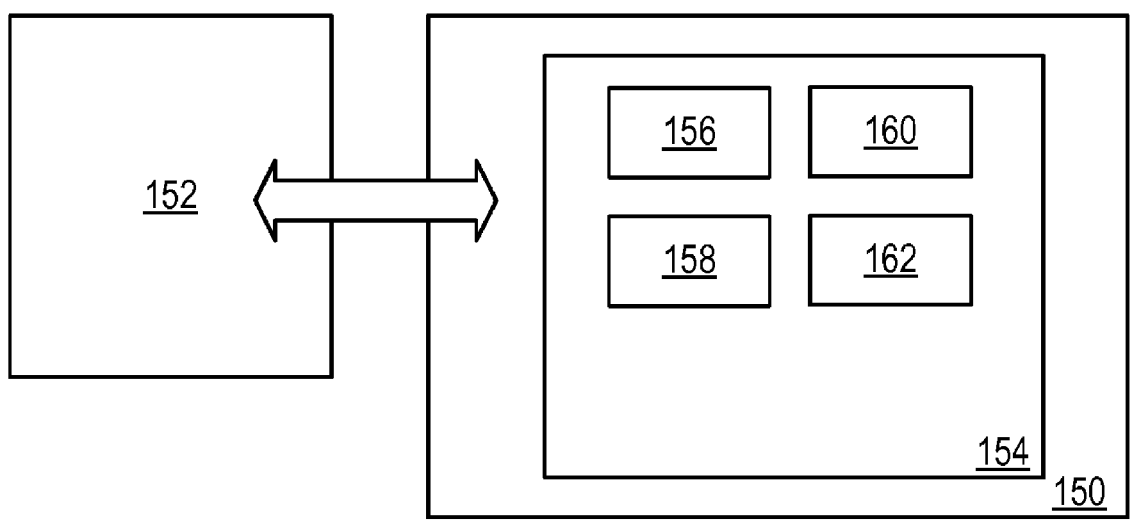
FIG. 3 is a schematic representation of a processor associated with a memory according to an example.

FIG. 3 shows an example of a processor 150 associated with a memory 152. The memory 152 comprises computer readable instructions 154 which are executable by the processor 150. The instructions 154 comprise:

Instructions 156 to receive a message from a target indicating that the target has entered a controlled mode of operation;

Instructions 158 to receive messages from a monitored component over a low-latency communication link;

Instructions 160 to fetch a message from a memory structure of a monitor; and Instructions 162 to compare a message to an expected control flow operation.

Such machine-readable instructions may also be loaded onto a computer or other programmable data processing devices, so that the computer or other programmable data processing devices perform a series of operations to produce computer-implemented processing, thus the instructions executed on the computer or other programmable devices provide an operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. An intrusion detection system, comprising:
a monitor to receive messages from a target over a communication link comprising a controlled access memory structure logically positioned between the target and the monitor using a point-to-point interconnect, the controlled access memory structure to store the messages including a message from the target indicating that the target has entered a System Management Mode (SMM) that is a privileged execution mode of a central processing unit (CPU),
the monitor to compare the messages retrieved from the controlled access memory structure to information of an expected behavior of the target, for detecting a deviation from the expected behavior that is indicative of an intrusion.

2. The intrusion detection system of claim 1, wherein the controlled access memory structure comprises a linear or circular array in which the messages are processed in an order in which the messages are received.

3. The intrusion detection system of claim 1, wherein a physical address of the target is mapped to the monitor.

4. The intrusion detection system of claim 1, wherein the monitor has exclusive access to the communication link while the target is executing.

5. The intrusion detection system of claim 1, wherein the monitor comprises a virtual machine instantiated over physical hardware allocated in a virtualized system using a hypervisor.

6. The intrusion detection system of claim 5, wherein the monitor comprises the hypervisor.

7. The intrusion detection system of claim 1, wherein the controlled access memory structure is provided as part of the target or the monitor or as a standalone component.

8. An intrusion detection system comprising a communication link between a target and a monitor, the communication link comprising a controlled access memory structure logically positioned between the target and the monitor using a point-to- point interconnect, the controlled access memory structure to receive a message from the target indicating that the target has entered a System Management Mode (SMM) of operation that is a privileged execution mode of a central processing unit (CPU).

9. The intrusion detection system of claim 8, wherein the target comprises a mapping from a physical address of the target to the monitor.

10. The intrusion detection system of claim 8, further comprising the monitor that has exclusive access to the communication link while the target is executing.

11. A monitor in an intrusion detection system, the monitor to:
receive messages from a monitored component over a low-latency communication link comprising a controlled access memory structure logically positioned between the monitored component and the monitor using a point-to-point interconnect, the controlled access memory structure to receive messages from the monitored component, the messages including a message indicating that the monitored component has entered a System Management Mode (SMM) that is a privileged execution mode of a central processing unit (CPU); and
compare the messages retrieved from the controlled access memory structure to information of an expected behavior of the monitored component, for detecting a deviation from the expected behavior that is indicative of an intrusion.

12. The monitor of claim 11, wherein the controlled access memory structure comprises a linear or circular array in which the messages received from the monitored component are processed in an order in which the messages are received.

13. The monitor of claim 11, wherein the controlled access memory structure comprises a mapping to a physical address of the monitored component.

14. The monitor of claim 11, wherein the monitor is a virtual machine instantiated over physical hardware allocated in a virtualized system using a hypervi sor.

15. The monitor of claim 14, wherein the virtual machine comprises a secure execution environment inaccessible to other components of the virtualized system.

16. A non-transitory machine-readable storage medium encoded with instructions executable by a processor of a monitor to:
receive first messages from a monitored component over a low-latency communication link comprising a controlled access memory structure logically positioned between the monitored component and the monitor using a point-to-point interconnect; and
receive a message from the monitored component indicating that the monitored component has entered a System Management Mode (SMM) that is a privileged execution mode of a central processing unit (CPU).

17. The non-transitory machine-readable storage medium of claim 16, wherein the instructions are executable by the processor of the monitor to:
compare the first messages retrieved from the controlled access memory structure to information of an expected behavior of the monitored component, for detecting a deviation from the expected behavior that is indicative of an intrusion.

* * * * *